United States Patent
Moffatt et al.

(10) Patent No.: US 6,602,335 B2
(45) Date of Patent: Aug. 5, 2003

(54) PIGMENT SOLUBILIZATION VIA TREATMENT WITH STRONG BASE AND SUBSTITUTION

(75) Inventors: John R Moffatt, Corvallis, OR (US); Joseph W Tsang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 09/851,659

(22) Filed: May 8, 2001

(65) Prior Publication Data

US 2002/0195022 A1 Dec. 26, 2002

(51) Int. Cl.$^7$ .......................... C09D 11/02; C09B 27/00
(52) U.S. Cl. ................ 106/31.8; 106/31.75; 106/31.78; 106/31.81; 106/31.86; 106/496
(58) Field of Search .............................. 106/31.8, 31.75, 106/31.81, 31.86, 31.78, 496

(56) References Cited

U.S. PATENT DOCUMENTS

| | | | | |
|---|---|---|---|---|
| 4,734,137 A | * | 3/1988 | Kasahara et al. | 106/497 |
| 5,554,739 A | | 9/1996 | Belmont | 534/885 |
| 5,571,311 A | | 11/1996 | Belmont et al. | 106/31.6 |
| 5,837,045 A | * | 11/1998 | Johnson et al. | 106/31.85 |
| 5,922,118 A | | 7/1999 | Johnson et al. | 106/31.6 |
| 5,928,419 A | * | 7/1999 | Uemura et al. | 106/493 |
| 6,432,194 B2 | * | 8/2002 | Johnson et al. | 106/499 |
| 2002/0088375 A1 | * | 7/2002 | Komatsu et al. | 106/472 |

FOREIGN PATENT DOCUMENTS

| | | | | |
|---|---|---|---|---|
| WO | WO 96/18695 | 6/1996 | | C09D/11/00 |
| WO | WO 96/18696 | 6/1996 | | C09D/11/02 |

\* cited by examiner

*Primary Examiner*—Helene Klemanski

(57) ABSTRACT

A method for dispersing a pigment in an aqueous solution is provided. The method comprises: (a) providing the pigment, which is distinguished in having an azo group and either a β-diketo structure or a hydroxyl group, each conjugatively associated with the azo group; (b) treating a surface of the pigment with a base having sufficient strength (e.g., a $pK_a$ of at least 6) to generate a negative charge on the pigment; and (c) reacting the negatively charged pigment with either (1) a first hydrophilic molecule containing at least one functional group comprising a carbon—carbon double bond and a carbonyl that is alpha to the carbon—carbon double bond which reacts via addition to form a hydrophilic group on the pigment or (2) a second hydrophilic molecule containing at least one functional group selected from the group consisting of anionic functional groups, cationic functional groups, and zwitterionic functional groups and at least one suitable leaving group which reacts via substitution to form a hydrophilic group on the pigment. The treated pigment is rendered comparatively soluble in water-based inks, thereby eliminating the need for any dispersant to disperse the pigment.

24 Claims, No Drawings

PIGMENT SOLUBILIZATION VIA TREATMENT WITH STRONG BASE AND SUBSTITUTION

TECHNICAL FIELD

The present invention relates generally to inkjet inks and, more particularly, to pigment-based inks wherein the pigment is solubilized.

BACKGROUND ART

Inkjet inks comprise a combination of vehicle (one or more water-miscible organic co-solvents) and colorant (one or more water-insoluble dyes or water-soluble dyes or pigments), together with various additives (pH buffers, drop stabilizers, surfactants, algicides, and the like). While early work focused on water-soluble dyes, due to their brilliance, more recent work has centered on pigments, which are water-insoluble colorants, due to their superior waterfastness and smearfastness properties as compared to water-soluble dyes.

Solubilization of pigments in water remains a challenging problem. As colorants, pigments can afford many achievable attributes that heretofore dyes have not been able to achieve, i.e., waterfastness, lightfastness, and exceptionally high print quality. Non-covalent attachment of water-solubilizing polymers to pigments has been the most commonplace method for rendering them water-soluble. However, these polymers easily become displaced from the pigment particle over time and, consequently, a loss of dispersion stability results.

The best method for solubilizing pigments is direct covalent attachment of the solubilizing group. Cabot Corp. succeeded in employing this method via a diazotization reaction on carbon black and colored pigments; see, e.g., U.S. Pat. No. 5,554,739 to Belmont, U.S. Pat. No. 5,571,311 to Belmont et al, U.S. Pat. No. 5,922,118 to Johnson et al, PCT Application WO 96/18695, and PCT Application WO 96/18696. The diazotization reaction has some distinct advantages, but also suffers from some drawbacks, i.e., it must be run under acidic solution, the diazonium salt can only be made from aromatic amines, etc.

It is desirable to find other substitution reactions which accomplish the same task, but under different conditions and allow more flexibility in the synthesis of the self-dispersing pigment. Thus, specific chemistry on the surface of the pigment must be considered for the substitution reaction to occur.

DISCLOSURE OF INVENTION

In accordance with the present invention, a method for dispersing a pigment in an aqueous solution is provided. The method comprises:

(a) providing the pigment, the pigment distinguished in having an azo group and either a β-diketo structure or a hydroxyl group, each conjugatively associated with the azo group;

(b) treating a surface of the pigment with a base having a sufficient strength to generate a negative charge on the pigment; and (c) reacting the negatively charged pigment with either (1) a first hydrophilic molecule containing at least one functional group comprising a carbon—carbon double bond and a carbonyl that is alpha to the carbon—carbon double bond which reacts via addition to form a hydrophilic group on the pigment or (2) a second hydrophilic molecule containing at least one functional group selected from the group consisting of anionic functional groups, cationic functional groups, and zwitterionic functional groups and at least one suitable leaving group which reacts via substitution to form a hydrophilic group on the pigment.

The reaction in step (c) either comprises (1) a Michael addition reaction and exemplary hydrophilic molecules comprise a vinyl, an acrylate, a methacrylate, or a vinyl sulfone or (2) a nucleophilic substitution reaction and exemplary suitable leaving groups comprise chloride, sulfate, ethyl sulfate, bromide, tosylate, or methane sulfonate.

The treated pigment is rendered comparatively soluble in water-based inks, thereby eliminating the need for any dispersant to disperse the pigment.

Further in accordance with the present invention, an inkjet ink is provided, wherein the inkjet ink comprises a vehicle and a colorant, with the colorant comprising the treated pigment.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

All concentrations herein are expressed in weight percentages, unless otherwise indicated. The purity of all components is that employed in normal commercial practice for ink-jet inks.

Certain water-insoluble pigments, when placed in an appropriate solvent, are known to change from their original color and completely dissolve in such solvent.

For example, when Pigment Yellow 74 (PY74), which is water-insoluble, is placed a solution comprising methoxide ion and $CH_3CN$ as solvent, PY74 turns from yellow to purple and becomes completely soluble in $CH_3CN$. There is a corresponding red shift in $\lambda_{max}$ in the absorption spectrum. Upon addition of 2-sulfoethylmethacrylate, the purple color disappears and the yellow color returns. The reacted or modified pigment is soluble in water (the particle size obtained from light scattering measurements is about 100 to 200 nm).

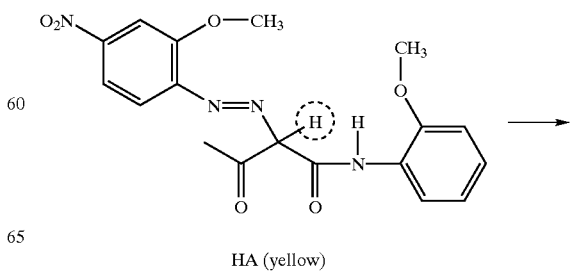

HA (yellow)

-continued

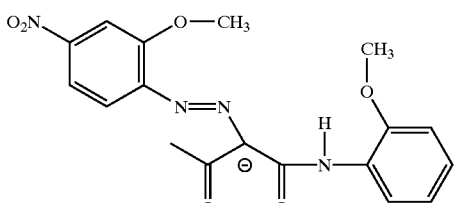

A⁻ (purple)

It is assumed that the anion, A⁻, has been generated from the pigment, HA, by removing the circled proton on HA with methoxide ion in CH₃CN. The circled proton on HA is a fairly strong acid, the anion of which being stabilized by the azo and β-diketo structures in PY74. The anion appears to be fairly stable in CH₃CN and inert solvents such as tetrahydrofuran (THF) and toluene. The formation appears to be fairly slow in 20 wt % of CH₃CN in water. In CH₃CN, the anion also reacts with 4-(chloromethyl)-benzoic acid in methoxide.

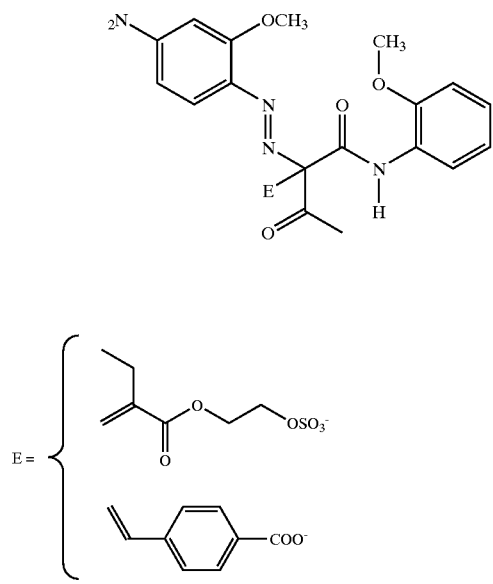

where E=electrophile.

The method appears to be a simple synthetic route for the attachment of solubilizing groups onto a pigment particle with the following types of structures, namely, an azo group and either a β-diketo structure or a hydroxyl group, each conjugatively associated with the azo group.

It is likely that covalent attachment of the solubilizing group can occur in two regions on the structure:

Site 1

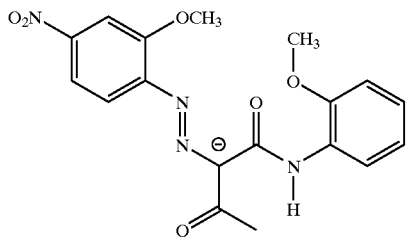

Site 2

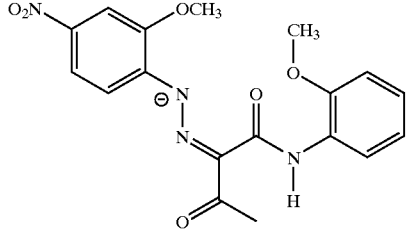

It is shown in the two configurations above that attachment can occur either on the carbanion or at the hydrazine anion moieties. The parent hydrazone is acidic (p$K_a$=4.5) and it is conceivable that the primary anionic form is the hydrazine anion. Thus, two sites are available for substitution.

Other different types of pigments can also undergo substitution even without the β-diketo linkage. For example, the phenazonaphthols exist in tautomeric form:

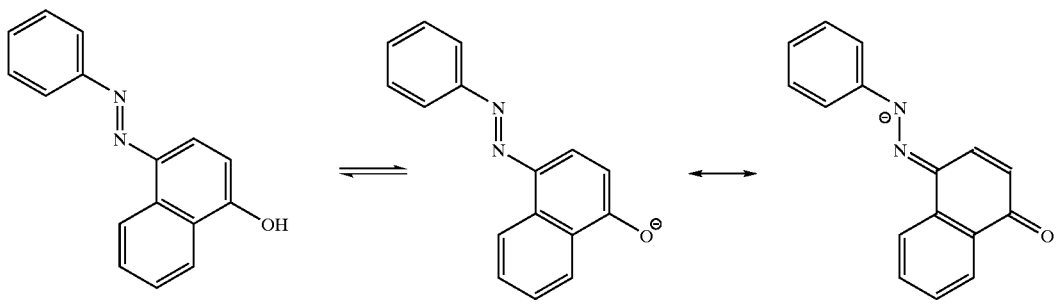

Substitution can occur at either of the two anionic sites.

Support for the existence of these tautomers comes from product studies and X-ray crystallography, which reveal that hydrazone tautomer formation predominates, i.e.:

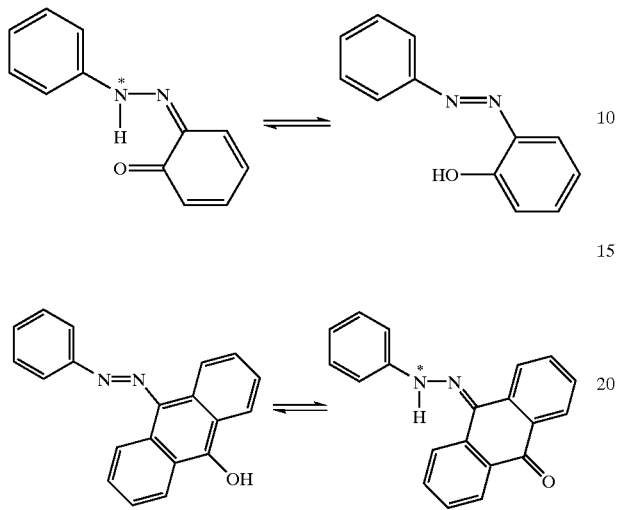

where * denotes substitution sites.

Thus, substitution occurring at the acidic hydrazone proton site could be another avenue for facile placement of the solubilizing groups on the pigment particles.

In accordance with the present invention, a pigment having an azo group and either a β-diketo structure or a hydroxyl group, each conjugatively associated with the azo group, is first treated with a base having sufficient strength to generate a negative charge on the pigment. Typically, the strength required to generate the negative charge is provided by employing a base having a $pK_a$ of at least 6.

The negatively-charged pigment is then reacted with either (1) a hydrophilic molecule containing at least one functional group comprising a carbon—carbon double bond and a carbonyl that is alpha to the carbon—carbon double bond that reacts via addition to form a hydrophilic group on the pigment or (2) a hydrophilic molecule containing at least one functional group selected from the group consisting of anionic functional groups, cationic functional groups, and zwitterionic functional groups and at least one suitable leaving group which reacts via substitution to form a hydrophilic group on the pigment. The former reaction is known as a Michael addition reaction, while the latter reaction is known as nucleophilic substitution.

The reaction of the pigment with base is discussed above, and may be represented schematically as:

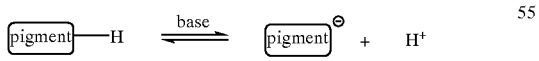

Schematically, the two types of reactions employed herein are represented as follows:

(1) Michael addition reaction:

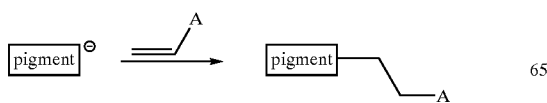

(2) Nucleophilic substitution:

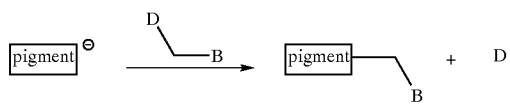

where D is a leaving group. Examples of suitable leaving groups include chloride, sulfate, ethyl sulfate, bromide, tosylate, and methane sulfonate.

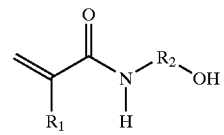

Solubilizing groups for the Michael addition reaction are selected from one or more of the following:

(a) acrylic and methacrylic acids and salts thereof:

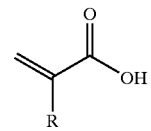

where R is H or $CH_3$;

(b) amides of acrylic and methacrylic acids:

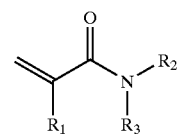

where $R_1$ is H or $CH_3$;

$R_2$ and $R_3$ are independently H or radicals of $C_1$ to $C_{30}$;

(c) diallyldialkyl ammonium halides:

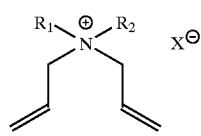

where $R_1$ and $R_2$ are independently H or a radical of $C_1$ to $C_{20}$, and $X^-$ is $F^-$, $Cl^-$, $Br^-$, $SO_4^{-2}$, or $PO_4^{-3}$;

(d) hydroxylic amides of acrylic and methacrylic acids:

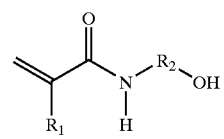

where $R_1$ is H or $CH_3$, and $R_2$ is a radical of $C_1$ to $C_6$;

(e) N-vinylpyrrolidone:

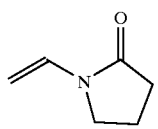

(f) 1-vinylimidazole:

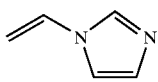

(g) vinylpyridine:

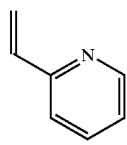

(h) N-phenyl amides:

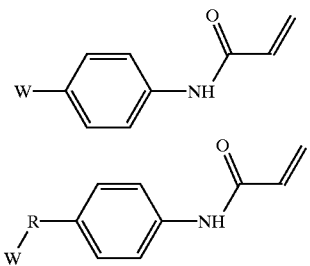

where W=$SO_3^-$, $CO_2^-$, $N(CH_3)_2O$, OH, or $NR_3^+$, and R is a radical of $C_1$ to $C_{30}$;

(i) N-vinylamides:

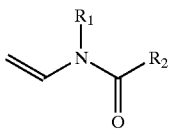

where $R_1$ and $R_2$ are independently H or a radical of $C_1$ to $C_{15}$;

(j) phenyl vinyl sulfones:

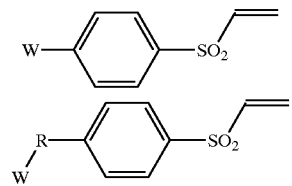

where W=$SO_3^-$, $CO_2^-$, $N(CH_3)_2O$, or OH
R is a radical of $C_1$ to $C_{30}$;

(k) polyethylene oxide alkenylphenols:

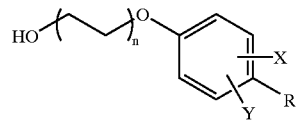

where X and Y are independently H or HC=CH,
R is a radical of $C_1$ to $C_{30}$, and
n is an integer of 1 to 100;

(l) polyunsaturated betaines:

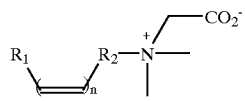

where $R_1$ and $R_2$ are independently radicals of $C_1$ to $C_{50}$, and
n is an integer of 1 to 10;

(m) polyunsaturated sulfobetaines:

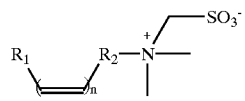

where $R_1$ and $R_2$ are independently radicals of $C_1$ to $C_{50}$, and
n is an integer of 1 to 10;

(n) polyunsaturated amine oxides:

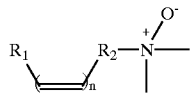

where $R_1$ and $R_2$ are independently radicals of $C_1$ to $C_{50}$, and
n is an integer of 1 to 10;

(o) polyunsaturated acids and acid salts thereof:

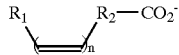

where $R_1$ and $R_2$ are independently radicals of $C_1$ to $C_{50}$, and
n is an integer of 1 to 10;

(p) styrene and its derivatives:

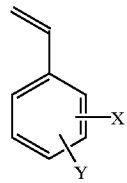

where X and Y are independently H, $NH_2$, $SO_3H$, $OCH_3$, or a radical of $C_1$ to $C_{10}$;

(q) sulfoalkyl(aryl) acrylate and methacrylate and salts thereof:

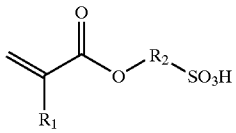

where $R_1$ is H or $CH_3$, and
$R_2$ is any alkyl or aryl or arylalkyl radical of $C_1$ to $C_{30}$; and (r) vinyl sulfonic acid and salts thereof:

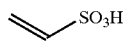

Solubilizing groups for the nucleophilic substitution reaction are selected from the following:

(a) 2,2-dichloro(m)ethyl phenyl sulfones:

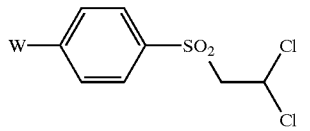

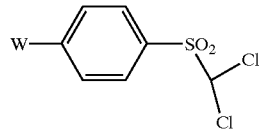

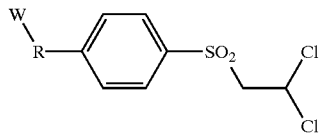

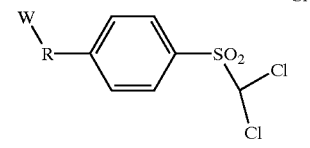

where W=$SO_3^-$, $CO_2^-$, $N(CH_3)_2O$, OH, or $NR_3^+$, and R is a radical of $C_1$ to $C_{30}$ (b) chloro(m)ethyl phenyl sulfones:

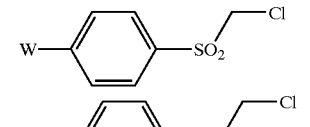

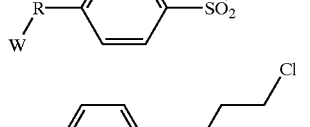

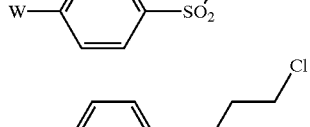

where W=$SO_3^-$, $CO_2^-$, $N(CH_3)_2O$, OH, or $NR_3^+$, and R is a radical of $C_1$ to $C_{30}$;
$R_2$ is a radical of $C_1$ to $C_{15}$;

(c) phenyl 2-(methyl ethyl sulfanato) ether, sodium phenyl 2-(methyl ethyl sulfanato) sulfide, phenyl 2-(methyl ethyl sulfanato) sulfone, N-phenyl-N-2-(methyl sulfanato) ethyl amine:

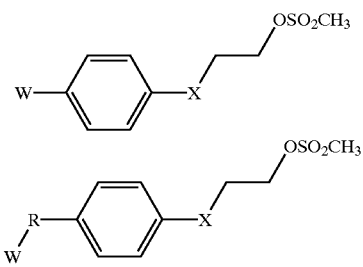

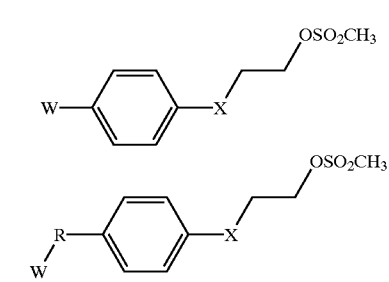

where X=O, S, $SO_2$, or NHO,
W=$SO_3^-$, $CO_2^-$, $N(CH_3)_2O$, OH, or $NR_3^+$,
R is a radical of $C_1$ to $C_{30}$;

(d) phenyl-(2-chloroethyl)amides:

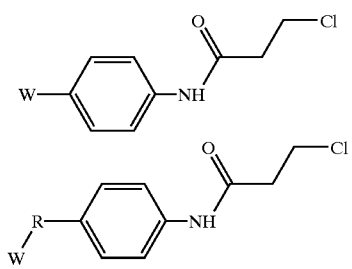

where W=$SO_3^-$, $CO_2^-$, $N(CH_3)_2O$, OH, or $NR_3^+$, and R is a radical of $C_1$ to $C_{30}$;

(e) amino-2-ethyl chlorides:

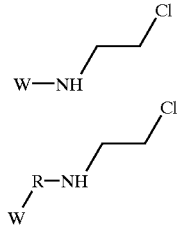

where W=$SO_3^-$, $CO_2^-$, $N(CH_3)_2O$, OH, or $NR_3^+$, and R is a radical of $C_1$ to $C_{30}$;

(f) sodium phenyl 2-(ethyl sulfanato) ether, sodium phenyl 2-(ethyl sulfanato) sulfide, sodium phenyl 2-(ethyl sulfonato) sulfone, N-phenyl-N-2-(ethyl sulfanato) ethyl amine:

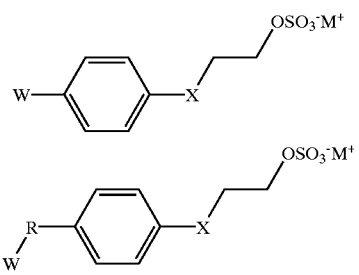

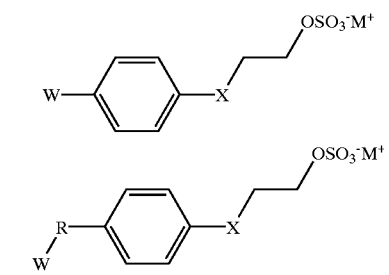

where X=O, S, $SO_2$, or NHO,
W=$SO_3^-$, $CO_2^-$, $N(CH_3)_2O$, OH, or $NR_3^+$,
R is a radical of $C_1$ to $C_{30}$, and
$M^+$=$Na^+$, $K^+$, $NH_4^+$, $(CH_3)_2NH_2^+$, $(CH_3)_4N^+$, $(C_4H_9)_4N^+$, $(C_3H_7)_4N^+$, etc.

(g) phenyl triazines

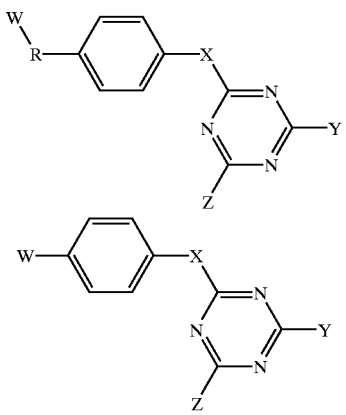

where X=O, S, SO$_2$, or NH,
Y or Z=H, Cl, F, or Br,
W=SO$_3^-$, CO$_2^-$, N(CH$_3$)$_2$O, or OH,
R is a radical of C$_1$ to C$_{30}$ (h) benzylics:

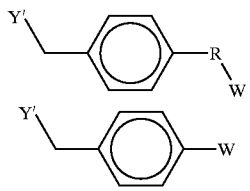

where R=is a radical of C$_1$ to C$_{30}$
W=SO$_3^-$, CO$_2^-$, N(CH$_3$)$_2$O, or OH, and
Y'=Cl, F, Br, OSO$_2$CH$_3$, or OSO$_2$C$_6$H$_4$—CH$_3$; and (i) α-halo ketones, α-halo keto carboxylic acids, α-halo keto sulfonic acids, α-halo keto amine oxides, and α-halo keto alcohols:

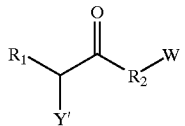

where R$_1$ and R$_2$ are independently radicals of C$_1$ to C$_{30}$,
W=SO$_3^-$, CO$_2^-$, N(CH$_3$)$_2$O, or OH, and
Y'=Cl, F, Br, OSO$_2$CH$_3$, or OSO$_2$C$_6$H$_4$—CH$_3$ Cationic counterions to the anions above include, but are not limited to, any of the common ammonium ions, such as dimethylammonium, trimethylammonium, dipropylammonium, and tetramethylammonium ions, as well as alkali ions, such as sodium, potassium, and lithium. Anionic counterions to the cations above include, but are not limited to, halide, nitrate, phosphate, aryl or arene sulfonate, carboxylate, carbonate, bicarbonate, borate, tetraborate, tetrafluoroborate, methane sulfonate, toluene sulfonate, phosphite, phosphonate, hexaflurophosphonate, phosphene, phenolate, perchlorate, tungstate, molybdate, hydroxide, sulfate, and silicate ions.

In formulating the ink-jet inks of the present invention, one or more co-solvents may be employed in the vehicle. These co-solvents are substantially water-miscible. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols. The co-solvent concentration may range from 0 to about 30 wt %, with about 3 to 15 wt % being preferred.

Pigments that may be suitably employed in the practice of the invention are distinguished in having an azo group and either a diketo structure or a hydroxyl group, each conjugatively associated with the azo group. Examples of classes of such pigments include diarylides, azo naphthols, diazo naphthols, and disazo diarylides. Specific examples include, but are not limited to:

Pigment Yellow 74 (available from Sun Chemical), Pigment Yellow 17 (available from Ciba-Geigy Pigments), Pigment Yellow 12 (available from Dainippon Ink and Chemicals);

Pigment Red 2 (CI#12210; available from Ciba-Geigy Pigments), Pigment Red 13 (CI#12395), Pigment Red 23 (CI#12355; available from Ciba-Geigy Pigments), Pigment Red 222, Pigment Red 238;

Pigment Blue 25 (CI#21180); and

Pigment Violet 25 (CI#12321).

The concentration of the solubilized pigment in the inkjet ink is within the range of about 0.1 to 20 wt % and, preferably, within the range of about 0.5 to 10 wt %.

A typical formulation for an ink useful in the practice of the present invention includes about 3 to 12 wt % of at least one water-miscible organic co-solvent, about 2 to 8 wt % of the treated pigment, and the balance water.

In the fabrication of the ink, the above-mentioned ingredients are combined and stirred mechanically or mixed using low power sonication.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffering agents may be used to control the pH of the ink. Other known additives such as viscosity modifiers and other acrylic or non-acrylic polymers may be added to improve various properties of the ink compositions as desired, such as conditioning the ejected ink droplets.

Summarizing, the present invention is directed to a technique for the solubilization for certain classes of pigments in which a fairly acidic proton is substituted for a water-soluble group on the surface of the pigment particle.

The technique is fairly easy to implement—the inventors carried it out in a test tube. The technique can employ a wide range of bases in aprotic solvents. Such bases include, but are not limited to, potassium or sodium hydroxide, sodium or potassium metals, sodium hydride, lithium diisoproylamide, potassium t-butoxide, sodium ethoxide, sodium isopropoxide, t-butylamine, piperidine, "proton sponge" (more than one site for extracting a hydrogen), etc. Aprotic solvents include, but are not limited to, substituted amide solvents (e.g., dimethylformamide, diiso-propyl formamide, and di-butyl formamide), sulfoxides (e.g., sulfolane), nitrites (e.g., acetonitrile), ethers (e.g., tetrahydrofuran and dimethoxyethane), and hydrocarbons (e.g., benzene, toluene, and aliphatic hydrocarbons).

INDUSTRIAL APPLICABILITY

The treated pigments of the present invention are expected to find use in inkjet inks.

What is claimed is:

1. A method for self-dispersing a pigment in an aqueous solution, said method comprising:
   (a) providing said pigment, said pigment distinguished in having an azo group and either a β-diketo structure or a hydroxyl group, each conjugatively associated with said azo group;
   (b) treating a surface of said pigment with a base having sufficient strength to generate a negative charge on said pigment; and
   (c) reacting said negatively charged pigment with either (1) a first hydrophilic molecule containing at least one functional group comprising a carbon—carbon double bond and a carbonyl that is alpha to the carbon—carbon double bond which reacts via addition to form a hydrophilic group on said pigment or (2) a second hydrophilic molecule containing at least one functional group selected from the group consisting of anionic functional groups, cationic functional groups, and zwitterionic functional groups and at least one suitable leaving group which reacts via substitution to form a hydrophilic group on said pigment.

2. The method of claim 1 wherein said base has a $pK_a$ of at least 6.

3. The method of claim 1 wherein said reacting comprises a Michael addition reaction.

4. The method of claim 3 wherein said first hydrophilic molecule is selected from the group consisting of acrylic acids and salts thereof, methacrylic acids and salts thereof, amides of acrylic acids, amides of methacrylic acids, diallylalkyl ammonium halides, hydroxylic amides of acrylic acids, hydroxylic amides of methacrylic acids, N-vinylpyrrolidone, 1-vinylimidazole, vinylpyridine, N-phenyl amides, N-vinyl amides, phenyl vinyl sulfones, polyethylene oxide alkenylphenols, polyunsaturated betaines, polyunsaturated sulfobetaines, polyunsaturated amine oxides, polyunsaturated acids and acid salts thereof, styrene and derivatives thereof, sulfoalkyl acrylate and salts thereof, sulfoalkyl methacrylate and salts thereof, sulfoaryl acrylate and salts thereof, sulfoaryl methacrylate and salts thereof, vinyl sulfonic acid and salts thereof.

5. The method of claim 1 wherein said reacting comprises a nucleophilic substitution reaction.

6. The method of claim 5 wherein said leaving group is selected from the group consisting of chloride, sulfate, ethyl sulfate, bromide, tosylate, and methane sulfonate.

7. The method of claim 5 wherein said second hydrophilic molecule is selected from the group consisting of 2,2-dichloromethyl phenyl sulfones, 2,2-dichloroethyl phenyl sulfones, chloromethyl phenyl sulfones, chloroethyl phenyl sulfones, phenyl 2-(methyl ethyl sulfanato) ether, sodium phenyl 2-(methyl ethyl sulfanato) sulfide, phenyl 2-(methyl ethyl sulfanato) sulfone, N-phenyl-N-2-(methyl sulfanato) ethyl amine, phenyl-(2-chloroethyl)amides, amino-2-ethyl chlorides, sodium phenyl 2-(ethyl sulfanato) ether, sodium phenyl 2-(ethyl sulfanato) sulfide, sodium phenyl 2-(ethyl sulfonato) sulfone, N-phenyl-N-2-(ethyl sulfanato) ethyl amine, phenyl triazines, benzylics, α-halo ketones, α-halo keto carboxylic acids, α-halo keto sulfonic acids, α-halo keto amine oxides, and α-halo keto alcohols.

8. The method of claim 1 wherein said pigment is selected from the group consisting of diarylides, azo naphthols, disazo naphthols, and disazo diarylides.

9. The method of claim 8 wherein said pigment is selected from the group consisting of Pigment Yellow 74, Pigment Yellow 17, Pigment Yellow 12, Pigment Red 2 (CI#12210), Pigment Red 13 (CI#12395), Pigment Red 23 (CI#12355), Pigment Red 222, Pigment Red 238, Pigment Blue 25 (CI#21180); and Pigment Violet 25 (CI#12321).

10. The method of claim 1 wherein said reacting is carried out in the presence of at least one base in at least one aprotic solvent.

11. The method of claim 10 wherein said at least one base is selected from the group consisting potassium hydroxide, sodium hydroxide, sodium metals, potassium metals, sodium hydride, lithium diisopropylamide, potassium t-butoxide, sodium ethoxide, sodium isopropoxide, t-butylamine, piperidine, and "proton sponges" and wherein said at least one aprotic polar solvent is selected from the group consisting of substituted amide solvents, sulfoxides, nitriles, ethers, and hydrocarbons.

12. An inkjet ink comprising a vehicle and a colorant, said colorant comprising a base-stabilized pigment, said pigment distinguished in having an azo group and either a β-diketo structure or a hydroxyl group, each conjugatively associated with said azo group, said pigment further including at least one hydrophilic group covalently bonded thereto, comprising either (1) a first hydrophilic group comprising a carbon—carbon double bond and a carbonyl that is alpha to the carbon—carbon double bond attached to said pigment or (2) a second hydrophilic group containing at least one functional group selected from the group consisting of anionic functional groups, cationic functional groups, and zwitterionic functional groups attached to said pigment.

13. The inkjet ink of claim 12 wherein said first hydrophilic group is based on a molecule selected from the group consisting of acrylic acids and salts thereof, methacrylic acids and salts thereof, amides of acrylic acids, amides of methacrylic acids, diallylalkyl ammonium halides, hydroxylic amides of acrylic acids, hydroxylic amides of methacrylic acids, N-vinylpyrrolidone, 1-vinylimidazole, vinylpyridine, N-phenyl amides, N-vinyl amides, phenyl vinyl sulfones, polyethylene oxide alkenylphenols, polyunsaturated betaines, polyunsaturated sulfobetaines, polyunsaturated amine oxides, polyunsaturated acids and acid salts thereof, styrene and derivatives thereof, sulfoalkyl acrylate and salts thereof, sulfoalkyl methacrylate and salts thereof, sulfoaryl acrylate and salts thereof, sulfoaryl methacrylate and salts thereof, vinyl sulfonic acid and salts thereof.

14. The inkjet ink of claim 12 wherein said second hydrophilic group is based on a molecule selected from the group consisting of 2,2-dichloromethyl phenyl sulfones, 2,2-dichloroethyl phenyl sulfones, chloromethyl phenyl sulfones, chloroethyl phenyl sulfones, phenyl 2-(methyl ethyl sulfanato) ether, sodium phenyl 2-(methyl ethyl sulfanato) sulfide, phenyl 2-(methyl ethyl sulfanato) sulfone, N-phenyl-N-2-(methyl sulfanato) ethyl amine, phenyl-(2-chloroethyl)amides, amino-2-ethyl chlorides, sodium phenyl 2-(ethyl sulfanato) ether, sodium phenyl 2-(ethyl sulfanato) sulfide, sodium phenyl 2-(ethyl sulfonato) sulfone, N-phenyl-N-2-(ethyl sulfanato) ethyl amine, phenyl triazines, benzylics, α-halo ketones, α-halo keto carboxylic acids, α-halo keto sulfonic acids, α-halo keto amine oxides, and β-halo keto alcohols.

15. The inkjet ink of claim 12 wherein said pigment is selected from the group consisting of diarylides, azo naphthols, disazo naphthols, and disazo diarylides.

16. The inkjet ink of claim 15 wherein said pigment is selected from the group consisting of Pigment Yellow 74, Pigment Yellow 17, Pigment Yellow 12, Pigment Red 2 (CI#12210), Pigment Red 13 (CI#12395), Pigment Red 23 (CI#12355), Pigment Red 222, Pigment Red 238, Pigment Blue 25 (CI#21180); and Pigment Violet 25 (CI#12321).

17. The inkjet ink of claim 12 wherein said pigment is present in said ink in an amount within a range of about 0.1 to 20 wt %.

18. The inkjet ink of claim 17 wherein said range is about 0.5 to 10 wt %.

19. The inkjet ink of claim 12 wherein said vehicle comprises water and at least one water-miscible co-solvent selected from the group consisting of aliphatic alcohols, aromatic alcohols, diols, glycol ethers, poly(glycol) ethers, caprolactams, formamides, acetamides, and long chain alcohols.

20. The inkjet ink of claim 19 wherein said at least one water-miscible co-solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides.

21. The inkjet ink of claim 20 wherein said at least one water-miscible co-solvent is selected from the group consisting of N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

22. The inkjet ink of claim 19 wherein said at least one co-solvent is present in an amount within a range of 0 to about 30 wt %.

23. The inkjet ink of claim 22 wherein said range is about 3 to 15 wt %.

24. The inkjet ink of claim 12 wherein said ink further comprises at least one additive selected from the group consisting of biocides, sequestering agents, buffering agents, viscosity modifiers, and ink-conditioning polymers.

* * * * *